(No Model.)
B. J. MORRIS.
SELF LOADING CART.
No. 317,467. Patented May 5, 1885.
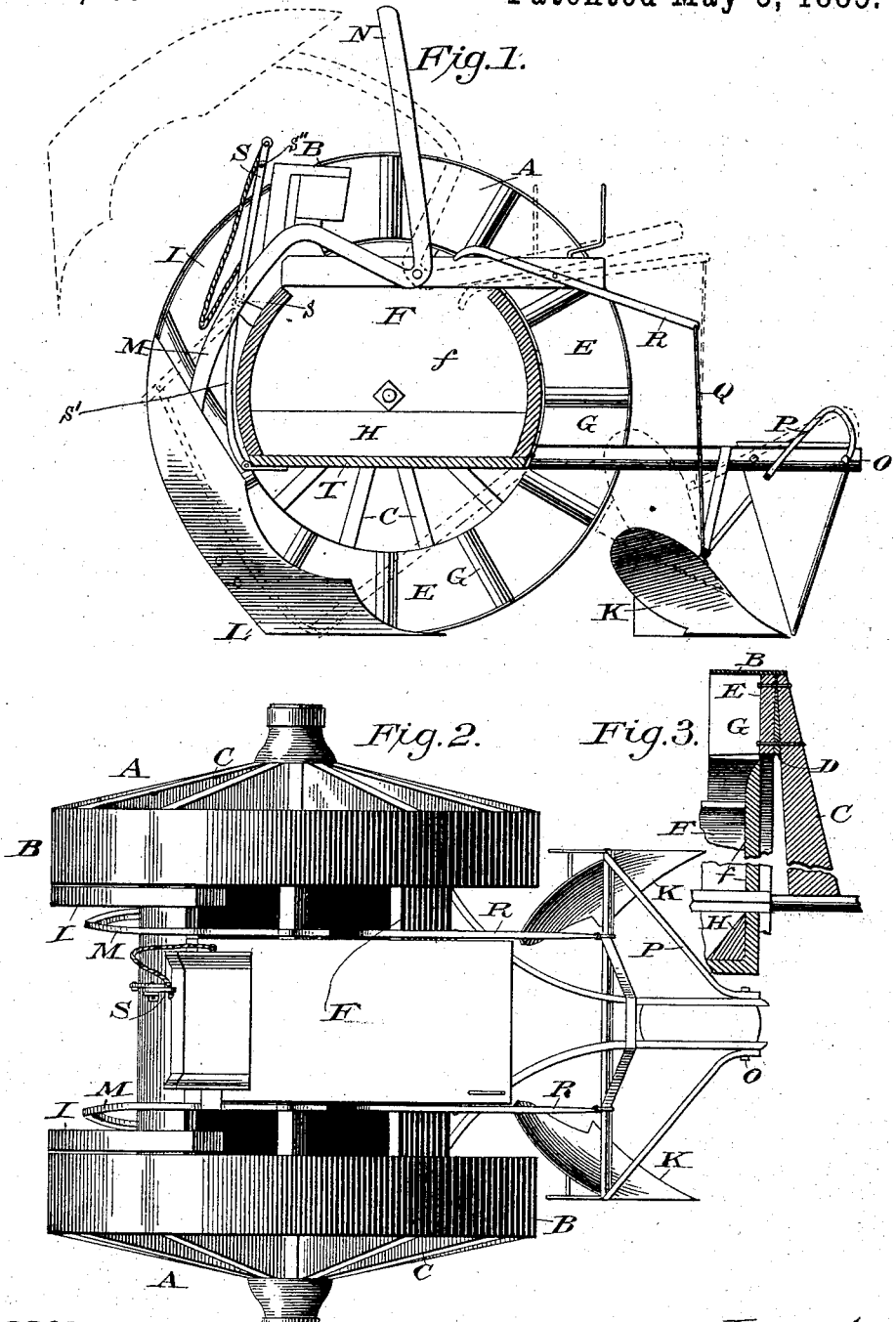
Witnesses:
Robert E. Finley
William H. Barton
Inventor:
Benjamin J. Morris

UNITED STATES PATENT OFFICE.

BENJAMIN J. MORRIS, OF MILLERSBURG, OHIO, ASSIGNOR OF ONE-HALF TO WELLINGTON STILWELL, OF SAME PLACE.

SELF-LOADING CART.

SPECIFICATION forming part of Letters Patent No. 317,467, dated May 5, 1885.

Application filed March 20, 1884. (No model.)

*To all whom it may concern:*

Be it known that I, BENJAMIN J. MORRIS, a citizen of the United States, residing at Millersburg, in the county of Holmes and State of Ohio, have invented a Self-Loading Cart, which is a new and useful invention for the loading, transportation, and unloading of earth in grading roads, streets, and other work wherein it is necessary to remove earth; and I do hereby declare that the following is a full, clear, and exact description of the invention, which will enable others skilled in the manufacture of machinery to construct the same, reference being had to the accompanying drawings, in which—

Figure 1 is a longitudinal vertical section, Fig. 2 a plan, and Fig. 3 a sectional detail view, of part of one wheel and of the cart bed or body.

The object of my invention is to load the cart while traveling, and when loaded have the same facilities for its transportation as if loaded in the ordinary cart. I attain this object by the construction of the wheels A, using iron or steel tires B not less than one foot wide for an ordinary-sized cart, the wheels six feet, more or less, in diameter, depending upon the amount of earth desirable to load. The spokes C should be twelve in number, but may vary in number, and on the inside are to stand perpendicular with a point on the inside of the tire, which may be more or less than one and one-half inch from the outside edge of such tire, the inner edge of which will project ten and one-half inches more or less inward of the inside plane of the spokes, and on the inside of each spoke at the end bearing on the tire a block, D, (see Fig. 3), bearing also on the tire, is to be bolted to the spoke of the same shape as the inside surface of the spoke and one foot in length for a wheel six feet in diameter, and in the same proportion for a different size. The block should be for the above size one and one-half inch thick as bolted through to the spoke, and together with the spoke where bearing on the tire may be widened horizontally for a few inches before reaching the tire in order to give more surface on the tire, thus giving strength, the spokes being fastened to the tire in the usual way for ordinary wheels.

Upon the blocks, as above described, a "felly" or "rim," E, is to be fitted of circular form, at least one inch thick and fitting closely inside the tire, of the same width, measuring from the tire toward the center, as to be flush with the end of the blocks D, which rim is to be fastened by bolts through the same into the blocks and spokes and also to the tire in the usual manner. Screws may be used instead of bolts. A space of two and one-half inches, more or less, is thus provided between the inside surface of the spokes at the hub end reaching to the ends of the blocks D, which space, as hereinafter described, will be partially occupied by the side-board $f$ of the cart-bed F, over which the inside surface of the rim E should project one-fourth of an inch at least.

The space between the inside surface of the rim and the inner surface of the tire from such surface of the rim to the inside edge of such tire is to be divided into as many compartments or parts as there are spokes by hard boards G, fitted to the tire and extending from the inside edge thereof to the felly or rim E, and of the same width toward the center of the wheel as the rim, the outer vertical edges of said boards resting on the felly or rim and being fastened thereto by heavy screws and to the tire in the same manner as the felly. The division-lines made by said boards should come as nearly as possible at the centers of the spaces between spokes, thus tending to strengthen the wheel and furnishing a support to the inner part of the tire from the edge thereof to the rim E, from the point where it meets which to its outer edge it is supported by the rim, blocks, and spokes, as aforesaid.

Thus constructed we have a wheel with an annular series of box-like spaces, the outsides thereof inclosed by the tire B and rim E, inclosing an interior circular space in a six-foot wheel with a twelve-inch rim of something less than four feet. Inside of this circular space the bed of the cart is to be constructed of any desired width in the line of the axle of the cart, but, measuring from front to rear, not to exceed (with allowance of room for working) the diameter of this inside circle. The hubs should be of large size. The axle may be of wood or iron. The bed F should be made of hard, well-seasoned wood, planed to one and one-half inch, and following the curve of the circular space described in section, as shown in Fig. 1, may project below the axle from six to twelve inches without inconvenience. The sides of the bed should be made smaller than the circular opening, leaving sufficient room between the same and the end of the blocks on the spokes, and also sufficient room between the outer edge thereof and the inner surface of the spokes to work without friction, and so set that the inner surfaces of the sides of the bed are outside of the inner surfaces of the rim.

Against each side of the bed a triangular piece of solid wood, H, is placed in the cart-body reaching to the axle vertically and horizontally to a point equal to the distance from the inside of the spokes to the inner edge of the tire, which piece of wood is to reach from front to rear of the cart-body and to be well fastened by bolts, screws, or otherwise to give solidity to the bed, and its surface from the side of the cart-body down to its inside edge is to be beveled smooth to direct the material in toward the center of the cart. To the front end (and at the bottom thereof) of the bed a door, T, is to be fastened by hinges, opening downward at the rear end.

The front and rear ends of the bed are to be covered to a point about forty degrees from the perpendicular, measuring on an arc struck from the axle as the center thereof and over the ends from the outer edge to the points perpendicular with the inner edge of the tire, steel bands may be placed thereon to reduce friction in the passage of earth over the same, as hereinafter described, and inside of the steel bands aforesaid vertical pieces I of board or other substance, of the same width as the rim and of the same shape thereas, are to be fastened to the cart-bed from a point above the top of the covered back or end of the bed down to a point within the circle of the wheel not less than ten inches from the ground to agree with the location of the shovels hereinafter described, the outside edge (vertical) of which board shall be nearly on a line with the inner edge of the tire, forming a covering for the inner side of the compartments or buckets made in the wheel, as hereinbefore described.

The tongue is to be fastened to the front end of the bed with heavy braces from the sides, and to the tongue in front are to be attached two plows, K, running directly in front of the wheels throwing the earth toward the center and forming a track for the wheels, while at the rear end of the cart a shovel-plow, L, is to be attached to beams M, which may either run over or under the bed, and the beams of the shovels are to be connected with or continued as levers N at the top of the bed on each side of the driver's seat. The plows K in front are fastened by a rod, O, upon which their beams P turn, and at the back part of each plow a rod, Q, connects with a lever, R, on each side, which is fastened to the top of the bed on a pivot so adjusted that when the levers N at each side are moved forward to raise the shovel behind they come in contact with the levers R on the respective sides in front and forcing the rear ends thereof down elevate the front end of said levers, and thereby raise each of front plows K from the ground by the same motion necessary to raise the shovel L.

The operation of said machine will thus be by a driver who has a seat on a platform, driving the team through any earth plowed or already soft, sandy, gravelly, or otherwise prepared for scraping. The shovels under the wheels will throw the earth into the boxes in the wheels, which, with their inside vertical sides covered by the side-board I hereinbefore described, and the fourth or inside circular surface protected and covered by the end portions of the back of the bed, will carry the earth to a point where it will be directly over the uncovered part of the bed at each side, when of its own weight it will fall from the boxes into the bed. One and one-half revolution will fill the bed.

When the cart is loaded, the driver will press the levers N forward, thus raising the plows and shovels from the ground, when he is free to drive any distance desired to deposit the earth, which is dumped from behind by the driver moving a lever, S, at the back of the seat, thus allowing the rear end of the bottom T of the cart to drop, and when the earth is deposited, pulling the lever toward him brings the bottom to its place. The lever S used in unloading is fastened to the rear end of the bed working on a pivot, $s$, some distance above the bottom of the bed, and taking said pivot as the center of a circle, when closed the lever S inclines towards the driver's seat, past the perpendicular from the pivotal point, which should be at a point on the bed the farthest from the center rearward, the bed being circular. To the bottom T of the bed is attached, also on pivot, either a chain, a curved lever, $s'$, to agree with the curve of the bed, or a double lever working on pivots at their intersection with each other, connected by pivot $s^2$ with the first-described lever, and when closed the weight of the bottom is brought to bear on the first-described lever at an angle of some ten degrees past the perpendicular, as aforesaid, thus holding the same stationary. To unload, the lever S is moved backward, describing about ten degrees over a quarter of a circle, which brings the pivotal point $s^2$ thereon nearer to the bottom as the same approaches a horizontal position, thus relaxing the chain or levers and allowing the bottom to drop by reason of its weight.

I am aware that carts of this class have had their bodies arranged to project within the circle of compartments of the wheels, and that semicircular covering-boards have been used, and therefore lay no claims to such, independently.

What I claim, and desire to secure by Letters Patent, is—

1. In a self-loading cart, a pair of wheels, A, consisting each of a tire, B, spokes C, blocks D, rim or felly E, and the boards G, all combined substantially as and for the purpose set forth.

2. In a self-loading cart, the combination of the wheels A, provided each with an annular series of compartments, the body F, arranged within the circles of compartments, and a pair of semicircular covering-boards, I, substantially as described.

3. In a self-loading cart, the combination of the wheels A, provided with an annular series of compartments, the plows K, arranged in advance of the wheels in the path of the same, and the double shovel-plow L, arranged between the wheels at the rear, substantially as and for the purpose set forth.

4. In a self-loading cart, the combination of the draft-tongue, the plows K, arranged in advance of the wheels, the rod O, the beams P, the rods Q, and the levers R, pivoted to the sides of a platform upon the body, substantially as described.

5. In a self-loading cart, the combination of the shovel-plow L and the beams M, connected with or continuing as levers N, pivoted to the sides of a platform upon the body, substantially as described.

6. In a self-loading cart, the combination of the body F with a platform upon its top, a shovel-plow, beams M, connecting said plow and platform, and a seat secured to and between said beams, substantially as described.

7. In a self-loading cart, the combination, with the front plows, K, and their rods Q and the levers R, pivoted to the sides of the platform on the body, of the rear shovel-plow, L, and its beams and levers M and N, respectively pivoted to the sides of said platform, whereby in depressing the levers N the front and rear plows are raised simultaneously, substantially in the manner and for the purpose set forth.

BENJAMIN J. MORRIS.

Witnesses:
JAMES C. CALHOUN,
S. N. SCHWARTZ.